Figure 1:
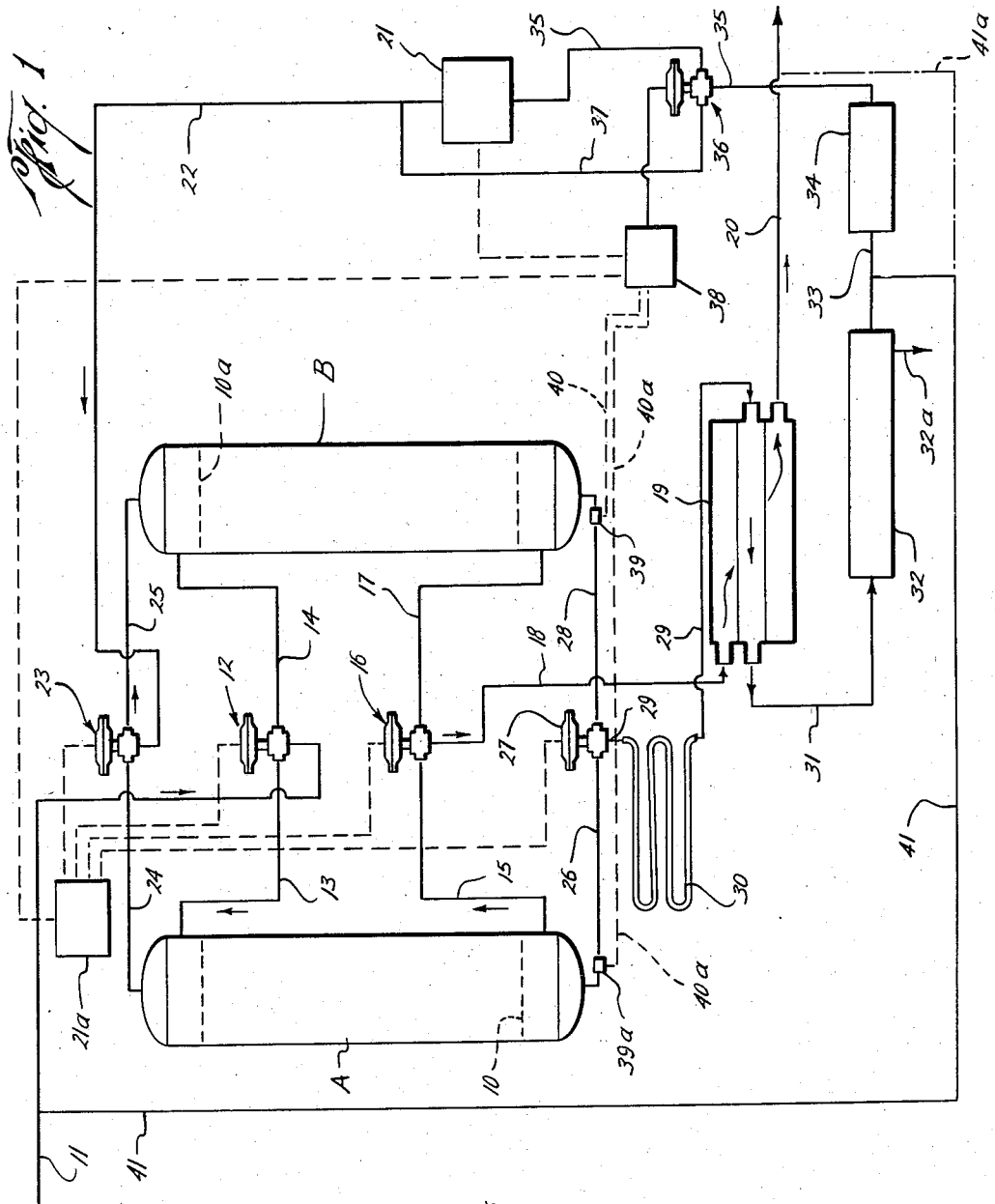

United States Patent Office 2,880,818
Patented Apr. 7, 1959

2,880,818

PROCESSES AND APPARATUS FOR RECOVERING HYDROCARBONS FROM GAS STREAMS

Willard M. Dow, Houston, Tex.

Application June 24, 1957, Serial No. 667,440

18 Claims. (Cl. 183—4.7)

This invention relates to new and useful improvements in processes and apparatus for recovering hydrocarbons from gas streams.

There are in general commercial use at the present time two primary processes for hydrocarbon recovery, including gasoline recovery, from natural gas streams; one is the oil absorption process which is widely used in the form of large central gasoline plants with recovery capacities of several thousand of barrels per day of numerous liquid products while the second is the low temperature refrigeration plant which is capable of recovering hydrocarbons from gas streams which are unusually rich in heavier hydrocarbon fractions. Most natural gas streams from producing gas wells contain only 0.100 to 0.300 gallon of pentanes plus per thousand cubic feet of gas and such streams are much too lean for the commercially successful operation of the low temperature refrigeration plant. For economic reasons, the large gasoline plant utilizing the oil absorption process is not practical for processing the gas from only one or a few gas wells.

Some success has been attained by relatively simple low-temperature separation units installed at the individual well, and such units utilize the energy of high pressure flowing gas in place of an auxiliary refrigeration source, to effect recovery of additional condensate. However, the units fail to recover a large amount, from 30 to 70 percent depending upon operating conditions, of the raw gasoline which remains in the gas stream. Furthermore, the use of this type of unit is limited by the requirement that the gas well have a high enough flowing pressure to assure its proper operation.

It is one object of the present invention to provide an economic hydrocarbon recovery process which will efficiently extract lighter hydrocarbons, such as propane and butane, as well as gasoline fractions from small, relatively lean gas streams, and which may be carried out by an apparatus comprising a portable skid-mounted assembly; said assembly being adaptable for use in processing gas from a single well or from only a few wells.

An important object is to provide an improved adsorption process employing a pair of beds of granular adsorbent material which are used to continuously adsorb hydrocarbon fractions from the gas stream, the latter being switched to flow through one bed and then the other, with the off stream bed being reactivated by a hot regenerating gas; the regenerating gas stream being handled in an improved manner to effect an increase in the recovery of the hydrocarbon fractions from the main gas stream.

Another object is to provide an improved adsorption process wherein the major portion of the regeneration gas stream is constantly recirculated in its own system with the result that the desirable hydrocarbon constituents with which such portion of the regeneration stream is saturated are retained in the regeneration gas system and are not discharged into the discharging main gas stream and thereby lost, as is the case with many processes now in use.

A particular object is to provide an improved adsorption process wherein the major portion of the regeneration gas stream is constantly re-cycled in its own system and also wherein a communication is established between the regeneration gas system and the main gas stream in such a manner that a flow back and forth between the regeneration gas system and the main gas stream may occur, whereby the regeneration gas supply is automatically replenished as needed and pressure changes in the regeneration gas system, due to heating and cooling of the regeneration gas, are compensated for.

Another object is to provide an adsorption process, of the character described, wherein the points of communication between the regeneration gas system and the main gas stream are located so as to minimize loss of the hydrocarbon constituents carried by the saturated regeneration gas when a part of said regeneration gas flows into the main gas stream; said points of communication also introducing the gas from the main gas stream into the regeneration gas system, when flow is in an opposite direction, at such location that said introduction of the gas from the main gas stream does not interfere or adversely affect the condensation and liquid separation functions of the process but rather enhances the stripping ability and efficiency of the regeneration gas stream.

A particular object is to provide a process, of the character described, wherein a minimum volume of regeneration gas may be employed and also wherein the process may be carried out with relatively short adsorbing and regenerating cycles.

A further object is to provide an improved apparatus for extracting lighter hydrocarbons, such as gasoline fractions, from a natural gas stream and including a pair of beds of adsorbent material, with means for alternately directing a main gas stream and a regenerating gas stream through the beds; the major portion of the regeneration gas being recycled through its own system which has constant communication with the main gas stream conductor at predetermined points, whereby a breathing back and forth between the regeneration gas system and the main gas stream may occur with the result that maximum recovery of the hydrocarbon constituents may be accomplished.

Still another object is to provide an improved adsorption apparatus having the various component units of such size that they may be mounted on a suitable skid or base whereby the apparatus is portable and is readily applicable to a single well; the apparatus functioning to extract lighter hydrocarbons from any type of gas stream but being particularly adapted for use in extracting gasoline fractions from small, relatively lean gas streams.

The construction designed to carry out the invention will be hereinafter described, together with other features thereof.

Figure 2:
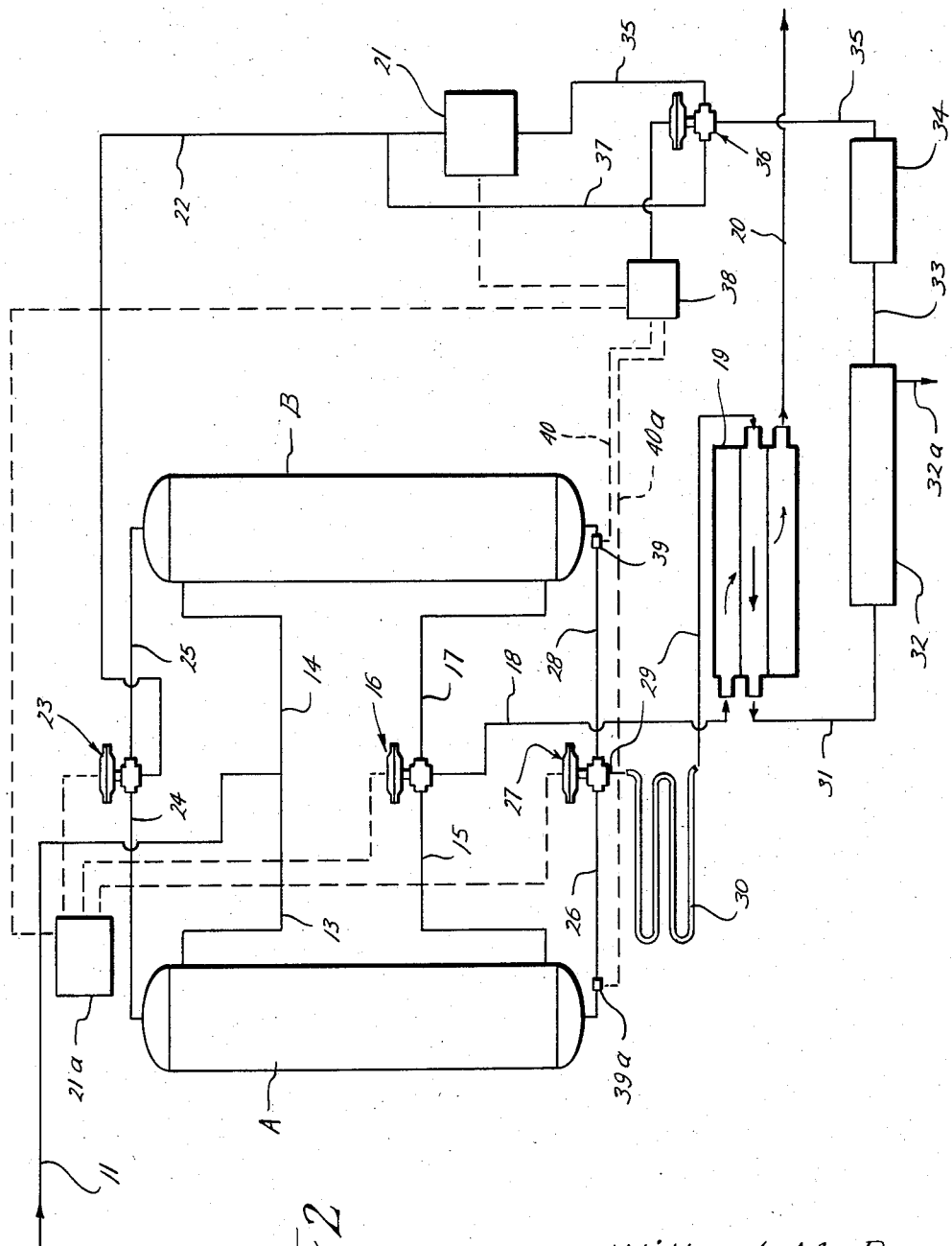

The invention will be more readily understood from a reading of the following specification and by reference to the accompanying drawings forming a part thereof, wherein an example of the invention is shown, and wherein:

Figure 1 is a schematic flow diagram of the process and apparatus, constructed in accordance with the invention, Figure 2 is a similar view of a slightly modified form of the invention, and Figure 3 is a sectional view of one of the adsorbing towers illustrating the condition of the bed at the completion of the regeneration cycle.

In the drawings, the letter A designates a vertical vessel or adsorbing tower which has a bed of adsorbent material 10 disposed therein. The particular adsorbent material which is employed is subject to variation but it has been found that silica gel or activated charcoal are satisfactory for the purpose. Both of these materials have an adsorption efficiency for the lighter hydrocarbons such as propane and butane and for gasoline fractions; in addition, silica gel will adsorb water so that where it is desired to dehydrate a gas stream as well as recover hydrocarbons therefrom, silica gel may be preferable. A second vertical vessel or adsorbing tower B has a similar bed 10a of adsorbent material therein and both adsorbing towers may be mounted on a suitable skid or base (not shown) to provide a portable unitary assembly.

A main gas stream inlet line 11 has connection with a three-way inlet valve 12 and a conductor 13 extends from the valve to the tower or vessel A, while a similar conductor 14 extends from the valve to the second tower B. The position of the valve 12, which may be pressure actuated and suitably controlled by any well known control mechanism, will determine the path of flow from the main inlet 11 to either one or the other of the adsorbing towers A and B. A discharge line 15 extends from the lower portion of the adsorbing tower A and has connection with a three-way discharge valve 16; a similar discharge line 17 extends from the lower portion of the adsorbing tower B and is also connected to the discharge valve 16. A main discharge conductor 18 extending from the valve 16 conducts the main gas stream from the assembly. As illustrated, the main stream discharging through conductor 18 is passed through a heat exchanger 19 and then escapes through an outlet line 20.

When the control valves 12 and 16 are in one position, the main gas stream will flow from the inlet line 11, through valve 12, through conductor 13 and into the upper end of the adsorbing tower A. The flow is then downwardly through the bed 10 of adsorbent material, which effects an extraction of the lighter hydrocarbons from the main stream. The dry main gas stream passes out through line 15, through control valve 16, discharge conductor 18, heat exchanger 19 and finally outwardly through the outlet 20. At this time the adsorbing tower A is on an adsorbing cycle and, as will be explained, the tower B will be undergoing regeneration.

After a predetermined lapse of time, which, of course, is set in accordance with particular conditions, the control valves 12 and 16 are operated to shut off flow of the main gas stream to and from the tower A and upon a shift in the position of said valves 12 and 16, the main gas stream is directed from inlet line 11, through valve 12, through conductor 14 and into the upper portion of the adsorbing tower B. The main gas stream then passes downwardly through the bed of adsorbent material 10a in tower B, outwardly through the discharge line 17, valve 16, conductor 18, heat exchanger 19 and outlet 20. During this period, the tower B is on an adsorbing cycle and the hydrocarbons are extracted from the main gas stream by the bed of adsorbent material 10a in said tower.

The time cycle of each adsorbing period is predetermined and is preferably controlled by an automatic control arrangement which is generally indicated as a control unit 21a. This unit may be set to operate on a time cycle or it may be operated in accordance with temperature conditions; in either case its operation switches flow through the towers. The valves 12 and 16 may be the usual pressure actuated three-way valves and at predetermined intervals, the unit 21a controls the application or release of a pilot pressure to said valves to actuate said valves and direct the flow from the main gas inlet line 11 to either one or the other of said towers.

After each tower has been on an adsorbing cycle for a predetermined length of time, the bed of adsorbent material therein will become saturated with the hydrocarbons which are extracted from the main gas stream. As is well known in this art, it is then necessary to regenerate or reactivate the bed by stripping or removing the adsorbed hydrocarbons from the bed and this is accomplished by directing a heated regeneration gas through said bed. The hot regeneration gas strips the bed of the hydrocarbon fractions by picking up such hydrocarbons and carrying them as vaporized liquids from the adsorbing tower. In the present arrangement, the regeneration gas is directed through that tower which is not on an adsorbing cycle, that is, when the main gas stream is flowing through the adsorbing tower A, the heated regeneration gas is directed through tower B so that the latter is on a regeneration cycle.

The regeneration gas is circulated through a separate and independent system or circuit which, as illustrated in Figure 1, includes a suitable heater 21 having a conductor 22 extending therefrom. The conductor has connection with a three-way inlet valve 23 which controls flow from said conductor either to an inlet line 24 communicating with the upper portion of the tower A or to an inlet line 25 communicating with the upper portion of the tower B. A discharge line 26 extends from the bottom of the tower A and connects with a three-way discharge valve 27; a similar discharge line 28 also has connection with the valve and extends from the bottom of the tower B. The position of valve 27 controls the discharge from one or the other of said towers through a discharge conductor 29. The conductor 29 has an atmospheric heat exchanger 30 connected therein and beyond this heat exchanger said conductor 29 has connection with the heat exchanger 19 to direct the regeneration gas through said heat exchangers. From the heat exchanger 19 the regeneration gas is conducted through line 31 to a liquid accumulator 32 and passes from said accumulator through line 33 to a pump 34. The pump returns the regeneration gas to the heater 21 through a conductor 35 to complete the circuit. A three-way control valve 36 is mounted in line 35 and a bypass line 37, the purpose of which will be hereinafter explained, connects with the control valve 36 and extends to the conductor 22 on the opposite or downstream side of the heater.

Assuming that the tower B is on a regeneration cycle, the regeneration gas flows from the heater 21 wherein it was heated to the desired temperature, passes through the control valve 23 and inlet line 25 into the upper end of the adsorbing tower B. The hot regeneration gas flows downwardly through tower B and strips the bed of the hydrocarbon fractions which were previously adsorbed from the main gas stream by picking up said hydrocarbon fractions and removing them from the bed in the form of vaporized constituents. The regeneration gas, containing the hydrocarbon fractions in vaporized form, discharges from tower B through line 28, passes through valve 27 and into the discharge line 29, after which it is conducted through the atmospheric heat exchanger 30 where the hot gas is cooled by reason of its being passed in heat exchange relationship to atmosphere. Thereafter, the regeneration gas flows through the heat exchanger 19 where it is further cooled as it passes in heat exchange relationship with the relatively cool main gas stream discharging from the assembly. The cooling of the gas by the heat exchangers 30 and 19 results in condensing the hydrocarbon fractions, which have been picked up by the gas, and these condensed liquid fractions drop out of the regeneration gas stream as it flows through the liquid accumulator 32. The condensed liquids are removed from the accumulator 32 through a suitable outlet line 32a. The regeneration gas from which the liquids have been removed then flows through line 33 and is pumped by pump 34 through the return line 35 to the heater from which point it is recycled.

When the flows through the towers are switched, to place tower B on an adsorbing cycle, the hot regeneration gas is directed from conductor 22, through valve 23 to the inlet line 24 of tower A, then downwardly through the bed 10, outwardly through line 26, valve 27, heat exchangers 30 and 19, accumulator 32, pump 34 and finally back to the heater 21 for recycling.

During each regeneration cycle, it has been found desirable to circulate the hot regenerating gas for the first portion of said cycle and to circulate the regenerating gas, without the application of heat, for the remainder of said cycle. This procedure results in cooling the bed or at least the upper portion thereof prior to the tower being switched to the adsorbing cycle. Thus each regeneration cycle includes a heating period which is of sufficient length to strip the bed of hydrocarbons, followed by a cooling period which cools the bed.

To control the heating and cooling periods of each regeneration cycle, the three-way valve 36, which controls flow through the bypass line 37 bypassing the heater, is actuated by a control unit 38. This unit also has suitable connections with the heater 21 and with the control unit 21a which switches flow through towers A and B, whereby operation of the heater and switching of the flow may be under control of unit 38. If desired, unit 38 may be a time-cycle controller device so that actuation of bypass valve 35, operation of heater 21 and actuation of control unit 21a to switch flows may be solely on a predetermined time cycle. However, it is preferable that unit 38 be operated on a combination of time cycle and temperature in the regeneration system and for this purpose, a temperature-sensitive element 39 is connected in the regeneration gas discharge line 28 leading from tower B; the element has suitable connection, indicated by dotted line 40, with unit 38. A similar temperature-sensitive element 39a, connected as indicated by dotted line 40a to unit 38, is mounted in the regeneration gas discharge line 26.

Assuming that tower B is on a regenerating cycle, the cycle begins with control unit 21a having operated valves 23 and 27 to direct hot regenerating gas into tower B. At this time the control unit 38 has closed bypass valve 36 and heater 21 is operated to apply heat to the regeneration gas which is circulated through the regeneration gas circuit, as has been explained. The circulation of hot regeneration gas may continue until the temperature in the discharge line 28 reaches a predetermined point, at which time temperature-sensitive element 39 actuates control unit 38 and said unit, in turn, opens bypass valve 36 and shuts off the heater. This terminates the heating period of the regeneration cycle and thereafter the regeneration gas bypasses the heater and continues to circulate through the system. This is the cooling period of the regeneration cycle and is controlled on a time cycle basis by unit 38. When the predetermined time has elapsed, unit 38 actuates control 21a to switch flow and at the same time closes bypass valve 36 and starts the heater whereby the subsequent regeneration cycle is begun. Although it is preferable to control the length of the heating period of the regeneration cycle on temperature, this period may, if desired, be controlled on time. The operation is, of course, the same for all regeneration cycles through both towers A and B.

The regeneration gas is recycled through a circuit which is separate from the main gas stream flow. By confining the regeneration gas in its own circuit and constantly recycling the major portion thereof, said major portion which has become saturated with the desirable hydrocarbon fractions is not returned to the main gas stream upon the completion of each regeneration cycle; instead the major portion of the regeneration stream is retained in the regeneration circuit. Although the regeneration stream is in a saturated condition, the separate circuit arrangement makes it possible to employ a relatively small volume of regeneration gas and therefore, although saturated, the amount of hydrocarbon fractions contained in said regeneration gas is at a minimum.

The regeneration gas is heated and then cooled in its flow through its circuit and these variations in temperature result in pressure variations in the circuit. Where a relatively small volume of regeneration gas is employed, the gas is heated to a higher degree in order to assure efficient stripping and this accentuates the pressure variations which occur. For this reason, efficient operation is not possible with a completely closed circuit or system for the regeneration gas and one of the features of the present invention is the establishment of communication between the regeneration gas circuit and the main gas stream.

As illustrated in Figure 1, a balancing or breather line 41 has one end connected to the conductor 33 downstream of the liquid accumulator and upstream of the heater 21; the other end of said line has connection with the main gas stream inlet line 11 upstream of the adsorbing towers A and B. During the heating period of a regeneration cycle, the heat applied by the heater 21 increases the pressure of the regeneration gas to such extent that the pressure of the regeneration gas is greater than the pressure of the main gas stream and, therefore, a portion of the regeneration gas may breathe out and flow through the line 41 and into the inlet line 11 to become mixed with the main gas stream. This breathing out continues only until pressure balance is obtained. The regeneration gas stream is, of course, saturated with hydrocarbon constituents at its particular pressure and temperature but the regeneration gas exits from the regeneration circuit after cooling and also after all liquids have been removed so that the regeneration gas is carrying a minimum of hydrocarbon fractions. Furthermore, by introducing the regeneration gas into line 11 upstream of the adsorbing towers, this portion of the regeneration gas subsequently flows with the main gas stream through the particular adsorbing tower on the adsorbing cycle whereby these hydrocarbon fractions may be recovered in said adsorbing cycle.

When the cooling period of the regeneration cycle commences, the regeneration gas bypasses the heater and is circulated through the system without the application of heat. As the regeneration gas is cooled, the pressure of the main gas stream may be greater than that of the regeneration stream and a portion of the main gas from inlet line 11 may flow through balancing line 41 and "breathe in" to the regeneration gas system. However, the main gas stream is relatively dilute as compared with the saturated regenerated gas and enters the regeneration gas circuit downstream of the liquid accumulator. Therefore, the entry of some of the main gas stream does not affect or in any way interfere with the condensation and liquid separation functions which are carried out by the heat exchangers 19 and 30 and the liquid accumulator 32.

As a matter of fact, it is well known in the phase behavior field that the ability of a gas to pick up hydrocarbons is dependent upon pressure, temperature and composition of the gas stream and when the relatively dilute main gas enters the regeneration gas circuit and admixes with the saturated relatively rich regeneration gas, it changes the composition of the regeneration gas in a direction which increases the ability of the regeneration gas stream to pick up the hydrocarbon fractions from the adsorbent bed. Thus the entry of a part of the main gas stream into the regeneration gas circuit not only compensates for pressure changes during cooling but functions to form a more efficient regeneration gas stream for the succeeding regeneration cycle.

The particular process and apparatus herein disclosed may be actuated on relatively short adsorption and regeneration cycles. Since regeneration or re-activation of each bed is necessary before the succeeding adsorbing cycle, the time of the regeneration cycle becomes important. In the present process, the time of each regeneration cycle may be minimized because the flow of the regeneration gas and the flow of the main gas are co-current, that is, each enters the upper end of the tower and discharges from the lower portion. Since the regeneration gas flows downwardly, the bed will be stripped and heated during the heating period of the regeneration cycle and during the cooling period the unheated regeneration gas will begin to cool the bed from its upper end downwardly. With co-current flow, it is not necessary to completely cool the entire bed before beginning the next adsorbing cycle for, as illustrated in Figure 3, switching of flow may occur when the upper portion of the bed, indicated at C, has been cooled, the lower portion, indicated at D still being heated. Upon the beginning of the adsorbing cycle, the incoming main gas will drive the cool regenerating gas in the upper portion of the bed downwardly and this, in turn, will drive any hot gas remaining out of the bed, the passage of the following cool gas completing the cooling of the bed. Thus, the regeneration cycle may be minimized and switch over of the flows may be on a reduced time cycle basis which is advantageous.

All of the physical units of the assembly, which includes the towers A and B, heat exchangers 19 and 30, liquid accumulator 32, pump 33 and heater 21, as well as the control valves, may all be mounted on a single base or skid structure so that the unit is readily portable. The apparatus is thus applicable for use processing gas streams from either a single well or from a very few wells.

Actual experience has shown that the adsorption efficiency for the extraction of hydrocarbon liquid fractions from a natural gas stream is affected primarily by temperature and to a lesser degree by gas composition and by static pressure. The adsorption efficiency is a function of the type of adsorbent material or desiccant material which is employed. For example, activated charcoal has a slightly greater adsorption efficiency for gasoline components than silica gel and is superior for the recovery of the lighter hydrocarbons such as propane and butane. However, silica gel has certain operational and economic advantages and is capable of dehydrating the gas stream while it is extracting the hydrocarbon liquid products. As heretofore noted, the present process contemplates the use of any desirable adsorbent material depending upon the particular hydrocarbon fractions which it is desired to recover.

Although the adsorption efficiency for the extraction of the hydrocarbon fractions is important, the overall recovery of hydrocarbon fractions is not merely a function of such adsorption efficiency but is influenced greatly by the effectiveness of the condensation of the vaporized extracted hydrocarbons during the regeneration process. With the process disclosed herein, a very efficient condensation operation is obtained. The system permits a relatively small volume of regeneration gas to be employed and this small volume may be heated to a relatively high degree whereby it is capable of picking up a relatively large quantity of the hydrocarbon fractions. After its passage through the bed, the regeneration gas is then cooled by the heat exchangers 30 and 19 so that by the time that the regeneration gas reaches the liquid accumulator 32, substantially all of the hydrocarbon fractions are condensed and in liquid form and may be withdrawn from the system through the liquid outlet 32a of the accumulator 32.

Figure 2 illustrates a slightly modified form of a process and apparatus in that the balancing line 41 of Figure 1 and the control valve 12 are omitted. In this form, the main gas inlet line 11 has connection with the lines 13 and 14 which lead into the upper portion of the towers A and B. The inlet control valve 12, which is provided in the form shown in Figure 1, has been omitted.

In the operation of this form, the main gas stream enters through the line 11 and will flow through either line 13 or 14 to one or the other of the adsorbing towers depending upon the position of the discharge control 16.

Assuming that tower A is on the adsorbing cycle, the flow of the main gas stream will be through tower A, then through line 15, valve 16 and discharge conductor 18. At this time regeneration gas flows from line 22, through control valve 23 into the upper end of tower B. The position of control valve 27, which controls discharge of the regeneration gas, allows the regeneration gas to flow downwardly through tower B and out through discharge line 28. In this case, the line 14 functions as a means for establishing communication between the regeneration gas circuit and the main gas inlet line 11 whereby a breathing or flow back and forth between the main stream gas and the regeneration gas circuit is possible.

Similarly, when the tower B is on the adsorbing cycle, the tower A is on the regeneration or heating cycle. At such time, the main gas stream flow is from the inlet 11 through line 14 and into tower B. Communication is then established through line 13 between the regeneration gas circuit and the main gas stream line 11. With the arrangement of Figure 2 it is not necessary to employ the balancing line 41 because either one or the other of the conductors 13 or 14 establish the communication between the regeneration gas circuit and the inlet line 11. The arrangement of Figure 2 differs from Figure 1 only in that the communication between the regeneration circuit and the main inlet line 11 is downstream of the heater 21, whereas, the point of connection of line 41 (Figure 1) with the regeneration circuit is upstream of the heater. Thus, in Figure 2 the hot gas from the regeneration circuit enters the main gas stream upon a breathing action, but since it is very small in volume as compared to the main gas stream, satisfactory results will be obtained.

Although it has been found preferable to establish communication between the regeneration gas circuit and the main gas stream by a connection upstream of the adsorbing towers, a connection may be made between the regeneration gas circuit and the main gas outlet 20 which is downstream of said towers. Such a connecting line is illustrated in dotted lines 41a in Figure 1. In this case, any regeneration gas saturated with hydrocarbons, which is breathed out of the system, would be lost since it becomes admixed with the discharging main gas. However, when main gas is breathed into the regeneration gas circuit, such main gas is substantially dry and would change the composition of the regeneration gas in a direction to additionally enhance the ability of the gas to strip the bed upon the succeeding regeneration cycle.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. The process of recovering hydrocarbon liquid fractions from a main gas stream including, flowing the main gas stream through a bed of adsorbent material to remove adsorbable hydrocarbon fractions therefrom, discharging the stripped main gas stream from the adsorbent material bed, stopping the flow of the main gas stream through the bed, circulating a regeneration gas through a regeneration circuit which includes the bed and also includes a condensing and separating zone, heating the regeneration gas at a point downstream of the condensing and separating zone and upstream of the discharge from the bed whereby as said gas circulates through its circuit the gas regenerates the bed and picks up the hydrocarbon fractions which fractions are subsequently condensed and separated as the regeneration gas passes through the condensing and separating zone, establishing a communication between the regeneration circuit and a source of gas which is outside of said circuit, and flowing gas either from the regeneration circuit to said gas source or from said gas source into said regeneration circuit through the communication establishing means in accordance with the pressure conditions obtaining in said regeneration circuit and said outside gas source.

2. The process as set forth in claim 1, with the additional steps of discontinuing the heating of the bed after a predetermined period of time, and thereafter directing cool gas through the bed to cool the same in preparation for a subsequent adsorbing cycle.

3. The process as set forth in claim 1, with the additional steps of discontinuing the heating of the regeneration gas after a predetermined period of time, and introducing gas from said outside source into said regeneration circuit following the discontinuance of the heating of said regeneration gas, the gas in said outside source being leaner with respect to recoverable hydrocarbon fractions than is the regeneration gas at the time of discontinuance of the heating step, whereby the introduction of said leaner gas into the regeneration circuit dilutes the regeneration gas to thereby increase its efficiency in picking up hydrocarbon fractions in a subsequent regeneration operation.

4. The process of recovering hydrocarbon liquid fractions from a main gas stream including, flowing the main gas stream through a bed of adsorbent material to remove adsorbable hydrocarbon fractions therefrom, discharging the stripped main gas stream from the adsorbent material bed, stopping the flow of the main gas stream through the bed, circulating a regeneration gas through a regeneration circuit which includes the bed and also includes a condensing and separating zone, heating the regeneration gas at a point downstream of the condensing and separating zone and upstream of the discharge from the bed whereby as said gas circulates through its circuit the gas regenerates the bed and picks up the hydrocarbon fractions which fractions are subsequently condensed and separated as the regeneration gas passes through the condensing and separating zone, establishing a communication between the regeneration circuit and a source of gas which is outside of said circuit, the gas in the communication establishing means being subject to the pressure conditions in the regeneration circuit and in the outside gas source and being adapted to flow through said communication establising means in either direction but in only one direction at any one time, the direction of flow of gas through the communication establishing means being controlled in accordance with the pressure conditions in said regeneration circuit and in said outside gas source.

5. The process set forth in claim 4, together with the addiitonal steps of discontinuing the heating of the regeneration gas after a predetermined period of time, thereafter continuing the circulation of the unheated regeneration gas through the regeneration circuit whereby the unheated gas cools the bed of adsorbent material, and introducing gas from said outside source into said regeneration circuit following the discontinuance of the heating of said regeneration gas, the gas in said outside source being leaner with respect to recoverable hydrocarbon fractions than is the regeneration gas at the time of discontinuance of the heating step, whereby the introduction of said leaner gas into the regeneration circuit dilutes the regeneration gas to thereby increase its efficiency in picking up hydrocarbon fractions in a subsequent regeneration operation.

6. The process of recovering hydrocarbon liquid fractions from a main gas stream including, flowing the main gas stream through a bed of adsorbent material to remove adsorbable hydrocarbon fractions therefrom, discharging the stripped main gas stream from the adsorbent material bed, stopping the flow of the main gas stream through the bed, circulating a regeneration gas through a regeneration circuit which includes the bed and also includes a condensing and seperating zone, heating the regeneration gas at a point downstream of the condensing and separating zone and upstream of the discharge of the bed whereby as said gas circulates through its circuit the gas regenerates the bed and picks up the hydrocarbon fractions which fractions are subsequently condensed and separated as the regeneration gas passes through the condensing and separating zone, establishing a communication between the regeneration circuit and the main gas stream to permit a flow of regeneration gas outwardly from the regeneration gas circuit to the main gas stream substantially throughout the period of heating of said regeneration gas circuit, discontinuing the heating of the regeneration gas after a predetermined period of time, continuing the circulation of the unheated regeneration gas through the regeneration circuit whereby the unheated gas cools the bed of adsorbent material in preparation for a subsequent adsorbing cycle, and flowing gas from the main gas stream into the regeneration circuit substantially throughout the period of circulation of the unheated regeneration gas, to thereby dilute the regeneration gas.

7. The process as set forth in claim 6, wherein the outflow of the gas from the regeneration circuit during the heating step and the inflow of gas into the regeneration circuit during the period of circulation of unheated regeneration gas is at a point in the regeneration circuit which is downstream of the condensing and separating zone and upstream of the bed.

8. The process as set forth in claim 6, wherein the outflow of the gas from the regeneration circuit during the heating step and the inflow of gas into the regeneration circuit during the period of circulation of unheated regeneration gas is at a point in the regeneration circuit which is downstream of the condensing and separating zone and upstream of the bed, and also wherein the flow into and out of the main gas stream is at a point in the main gas stream which is upstream of the bed of adsorbent material.

9. The process as set forth in claim 6, wherein the outflow of the gas from the regeneration circuit during the heating step and the inflow of gas into the regeneration circuit during the period of circulation of unheated regeneration gas is at a point in the regeneration circuit which is downstream of the condensing and separating zone and upstream of the bed, and also wherein the flow into and out of the main gas stream is at a point in the main gas stream which is downstream of the bed of adsorbent material.

10. The process set forth in claim 6, with the additional steps of discontinuing circulation of the unheated regeneration gas, and thereafter again directing the main gas stream through the bed to repeat the operation.

11. In an adsorption apparatus which comprises at least a pair of adsorption beds with means for alternately directing flow of a main gas stream having hydrocarbon fractions therein through one or the other of said beds to alternately place each bed on an adsorbing cycle, the improvement which resides in a regeneration gas circuit including heating means, condensing and separating means and that bed which is not on an adsorbing cycle, pump means for circulating the regeneration gas through the regeneration circuit whereby the gas is directed through the heating means and through the bed to regenerate said bed and to remove hydrocarbon fractions, said circulation also directing the gas through the condensing and separating means to separate said hydrocarbon fractions, conductor means establishing communication between the regeneration gas circuit and the main gas stream and having its opposite ends exposed to the pressure conditions in the regeneration gas circuit and in the main gas stream, whereby the gas in said conductor means may flow through said conductor means in either direction but in only one direction at any one time, the direction of flow of gas through the conductor means being controlled in accordance with the pressure conditions in said regeneration circuit and in said main gas stream.

12. In an adsorption apparatus, a regeneration gas circuit as set forth in claim 11, together with means for stopping the circulation of the heated regeneration gas through the bed, and means for directing a cool gas through the bed which has been heated to cool said bed in preparation for the succeeding adsorbing cycle.

13. In an adsorption apparatus, a regeneration gas circuit as set forth in claim 11, together with control means for shutting off the heating means after a predetermined period of time, whereby the circulation of unheated regeneration gas continues to flow through the bed in the regeneration circuit to complete the regeneration of and to cool said bed in preparation for the succeeding adsorbing cycle.

14. In an adsorption apparatus which comprises at least a pair of adsorption beds with means for alternately directing flow of a main gas stream having hydrocarbon fractions therein through one or the other of said beds to alternately place each bed on an adsorbing cycle, the improvement which resides in a regeneration gas circuit including that bed which is not on an adsorbing cycle and a condensing and separating means, pump means for circulating a regeneration gas through said regeneration gas circuit, means for heating the regeneration gas at a point downstream of the condensing and separating means and upstream of the discharge end of the bed whereby as said gas circulates through its circuit the gas regenerates the bed and picks up hydrocarbon fractions, said circulation also directing the gas through said condensing and separating means to separate hydrocarbon fractions, means establishing communication between the regeneration gas circuit and the main gas stream to permit a flow of regeneration gas outwardly from the regeneration gas circuit to the main gas stream substantially throughout the period that the heated regeneration gas is being circulated, and means for stopping heating of said regeneration gas after a predetermined period of time, whereby unheated regeneration gas is circulated through its circuit and through the bed to cool said bed in preparation for a subsequent adsorbing cycle, said communication establishing means permitting a flow of gas from the main gas stream and into the regeneration circuit substantially throughout the period of circulation of the unheated regeneration gas.

15. In an adsorption apparatus, the improvement set forth in claim 14, wherein the communication establishing means has connection with the regeneration gas circuit at a point in said circuit downstream of the condensing and separating means and upstream of the bed.

16. In an adsorption apparatus, the improvement set forth in claim 14, wherein the communication establishing means has connection with the regeneration gas circuit at a point in said circuit downstream of the condensing and separating means and upstream of the bed, and also wherein said communication esablishing means has connection with the main gas stream upstream of the bed which is on an adsorbing cycle.

17. An apparatus for separating hydrocarbons from a gas stream including, a first bed of adsorbent material, a second bed of adsorbent material, a main gas stream inlet conductor communicating with the inlet ends of said beds, control means for directing the main gas stream to one or the other of said beds, whereby the bed through which the main gas stream is directed is on an adsorbing cycle to adsorb hydrocarbon fractions and extract the same from the main gas stream, a discharge conductor communicating with the discharge ends of the beds for conducting the main gas stream therefrom, control means for directing the main gas stream from that bed which is on an adsorbing cycle, a regeneration gas circuit including the bed through which the main gas is not flowing, also including, a heater, a conductor connecting the heater with the inlet of said bed, a return line extending from the discharge end of the bed to the heater, condensing and separating means connected in the return line, a pump in the regeneration circuit for circulating the gas therethrough, control means for alternately connecting the beds in the regeneration circuit, whereby one bed is on an adsorbing cycle and the other bed is on a regenerating cycle, and conductor means establishing communication between the regeneration gas circuit at a point downstream of the condensing and separating means and the main gas stream at a point upstream of the bed which is on an adsorbing cycle, said conductor means having its opposite ends exposed to the pressure of the regeneration gas and to the pressure of the main gas stream respectively so that flow may occur in either direction within said conductor means, the direction of flow being controlled by pressure variations as caused by changes in the temperature of the gas contained in the regeneration circuit.

18. An apparatus as set forth in claim 17, wherein one complete regeneration cycle of a bed includes a heating period and a cooling period, control means in the regeneration circuit for operating the heater to heat the circulating regeneration gas during the first portion of each regeneration cycle and for shutting off the heater during the latter portion of said regeneration cycle, whereby the unheated regenerating gas circulates through the bed to cool the same.

References Cited in the file of this patent

UNITED STATES PATENTS

| | | |
|---|---|---|
| 2,535,902 | Dailey | Dec. 26, 1950 |
| 2,665,769 | Walker et al. | Jan. 12, 1954 |
| 2,739,670 | Miller | Mar. 27, 1956 |
| 2,784,805 | Odle et al. | Mar. 12, 1957 |
| 2,790,505 | Dow | Apr. 30, 1957 |
| 2,799,362 | Miller | July 16, 1957 |